Figure 1:
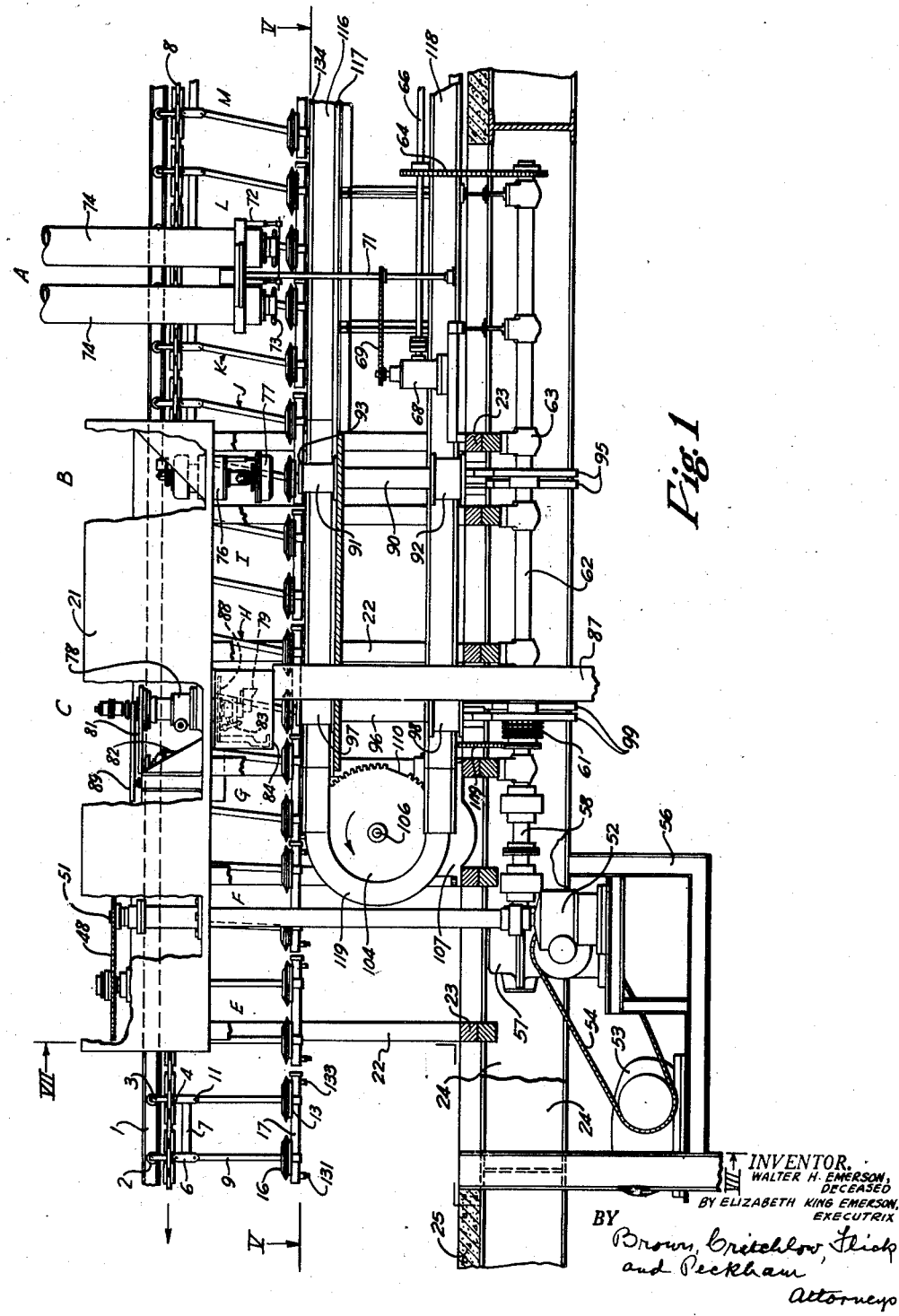

INVENTOR.
WALTER H. EMERSON, DECEASED
BY ELIZABETH KING EMERSON, EXECUTRIX

May 29, 1951 W. H. EMERSON 2,555,227
ARTICLE HANDLING APPARATUS
Filed May 21, 1948 9 Sheets-Sheet 3
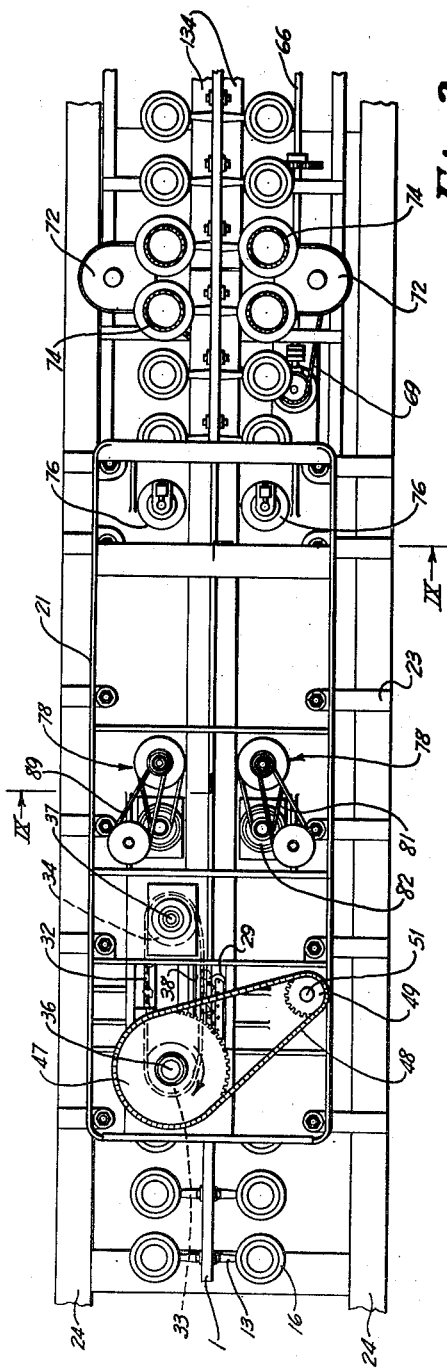
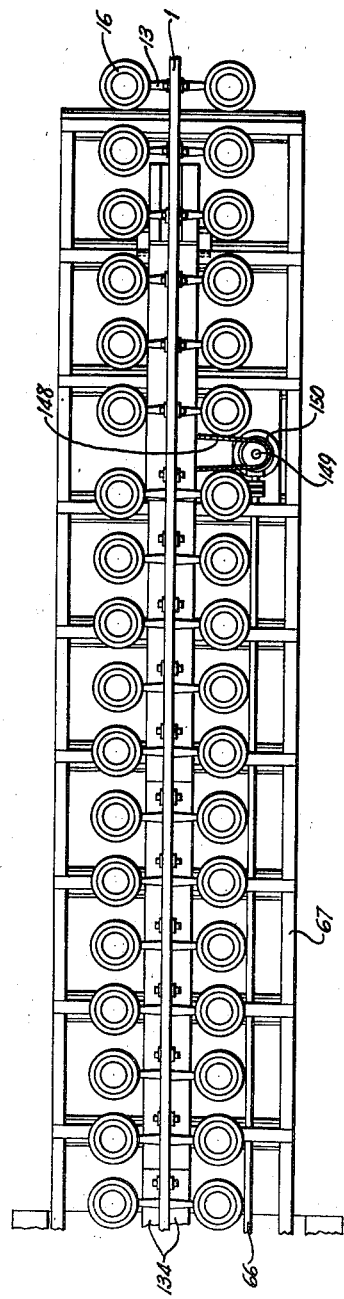
INVENTOR.
WALTER H. EMERSON, DECEASED
BY ELIZABETH KING EMERSON, EXECUTRIX
BY
Brown, Critchlow, Flick & Peckham
Attorneys

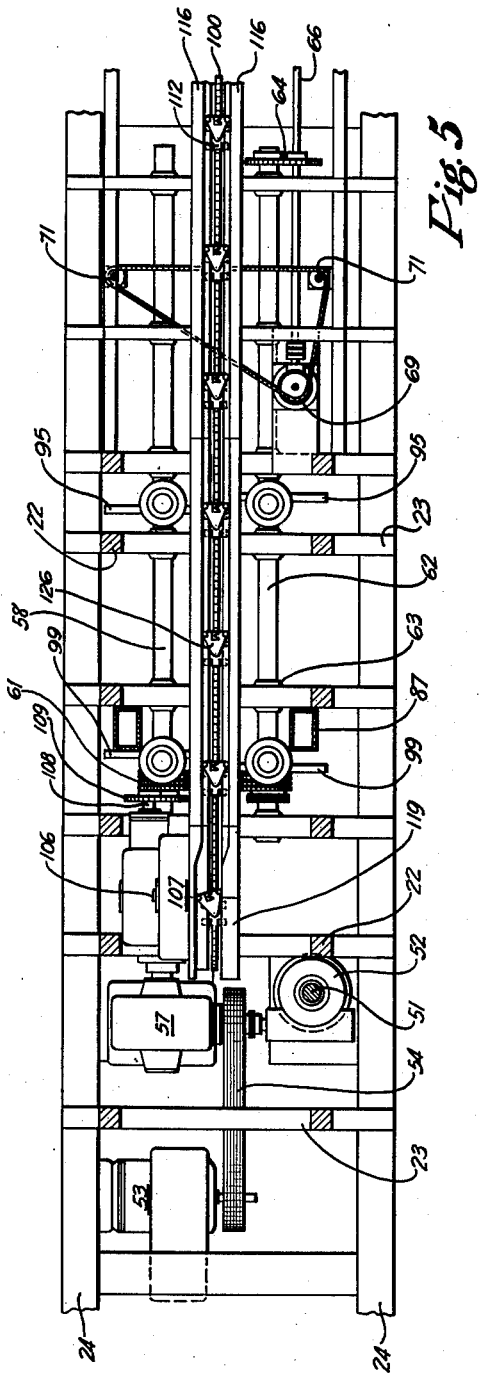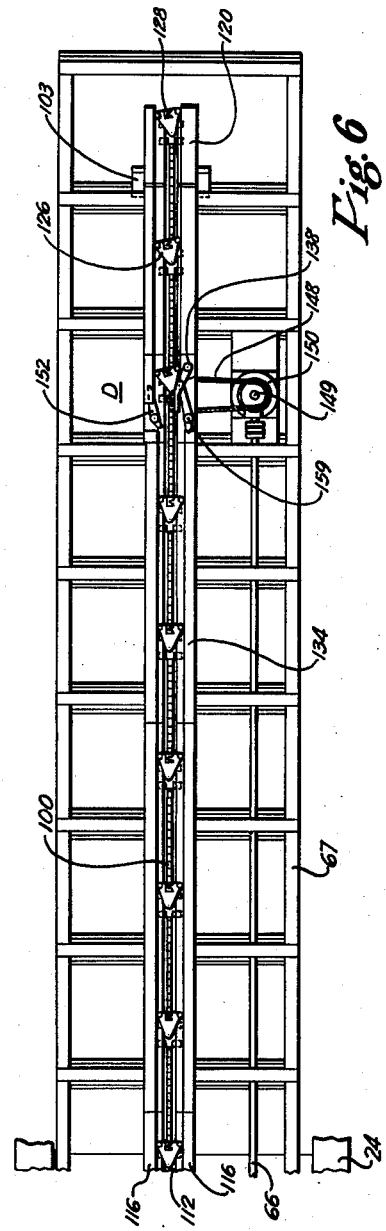

May 29, 1951  W. H. EMERSON  2,555,227
ARTICLE HANDLING APPARATUS
Filed May 21, 1948  9 Sheets-Sheet 5
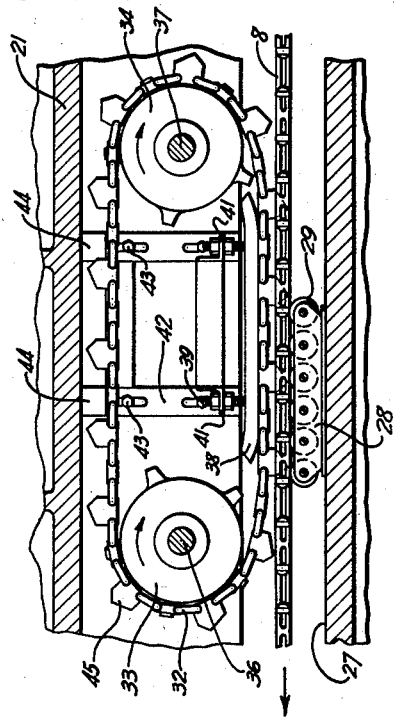
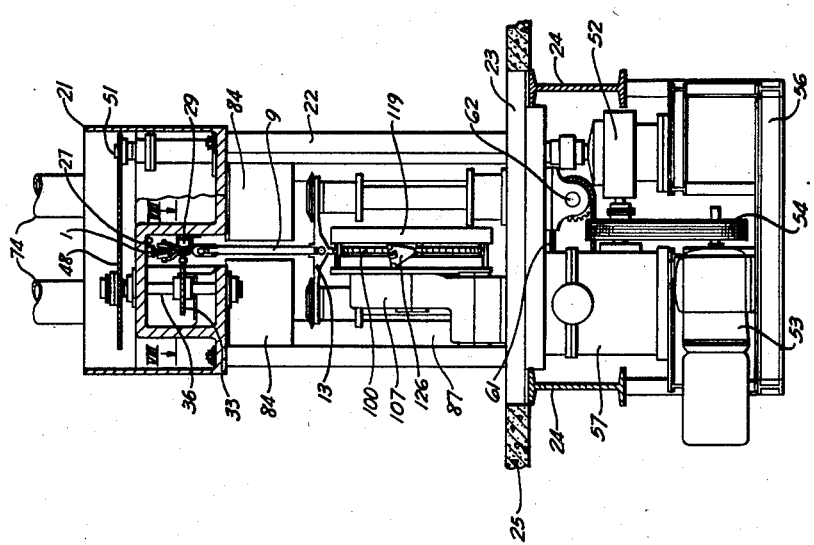
INVENTOR.
WALTER H. EMERSON, DECEASED
BY ELIZABETH KING EMERSON, EXECUTRIX
BY
Brown, Critchlow, Flick & Peckham
Attorneys.

May 29, 1951  W. H. EMERSON  2,555,227
ARTICLE HANDLING APPARATUS
Filed May 21, 1948  9 Sheets-Sheet 7
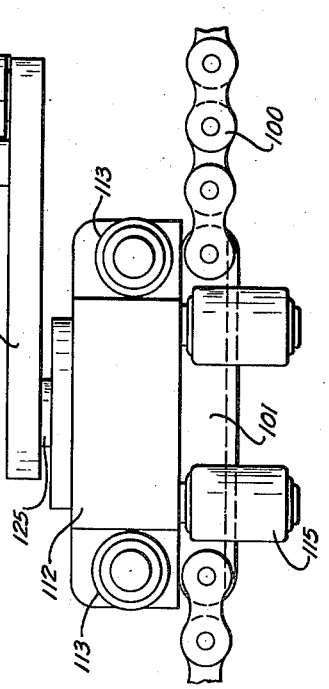
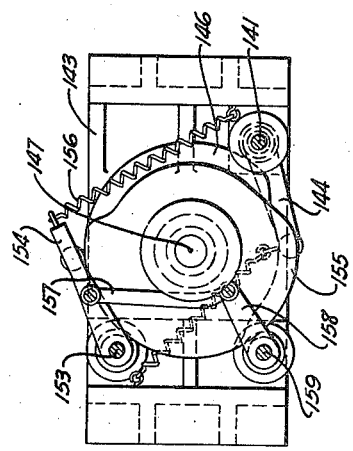
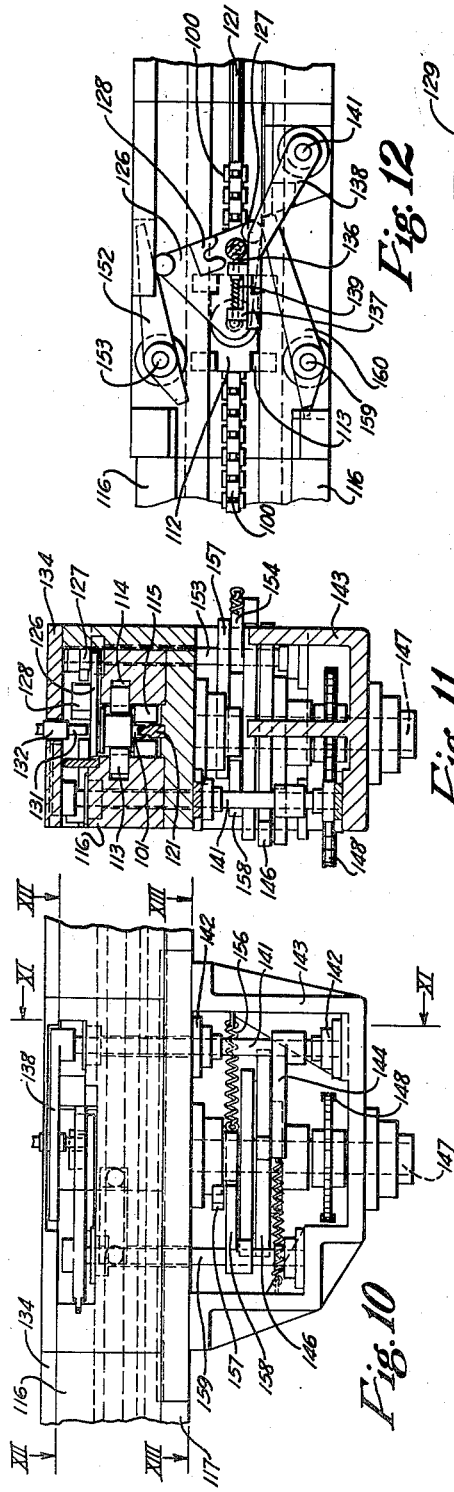
INVENTOR.
WALTER H. EMERSON, DECEASED
BY ELIZABETH KING EMERSON, EXECUTRIX
BY
Brown, Critchlow, Flick & Peckham
Attorneys.

May 29, 1951  W. H. EMERSON  2,555,227
ARTICLE HANDLING APPARATUS

Filed May 21, 1948  9 Sheets-Sheet 8

INVENTOR.
WALTER H. EMERSON, DECEASED
BY ELIZABETH KING EMERSON, EXECUTRIX
BY
Brown, Critchlow, Flick & Peckham
Attorneys.

May 29, 1951 W. H. EMERSON 2,555,227
ARTICLE HANDLING APPARATUS
Filed May 21, 1948 9 Sheets-Sheet 9
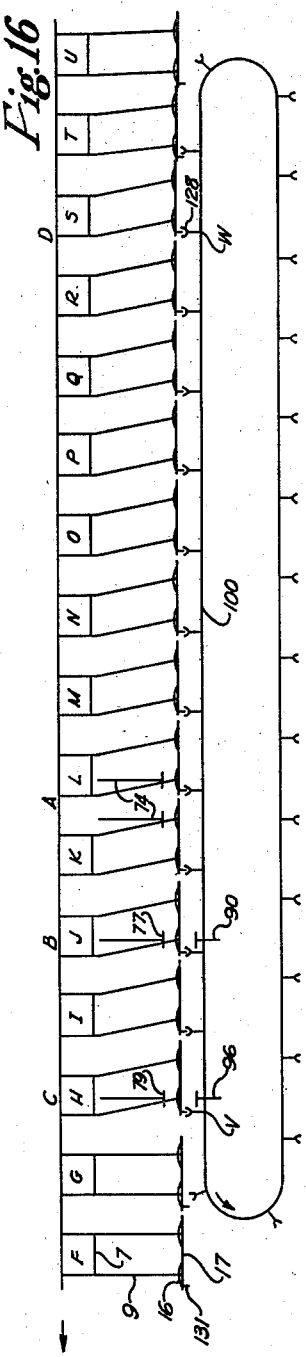
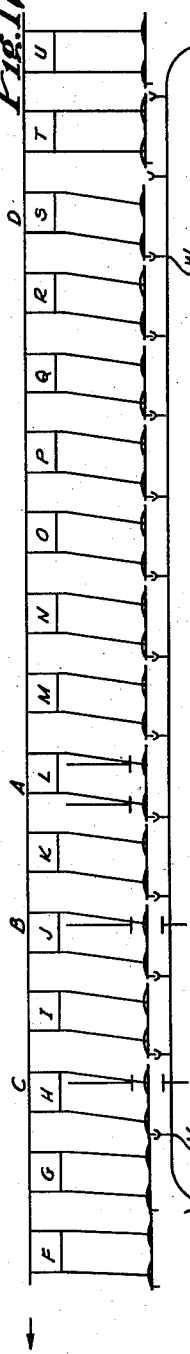
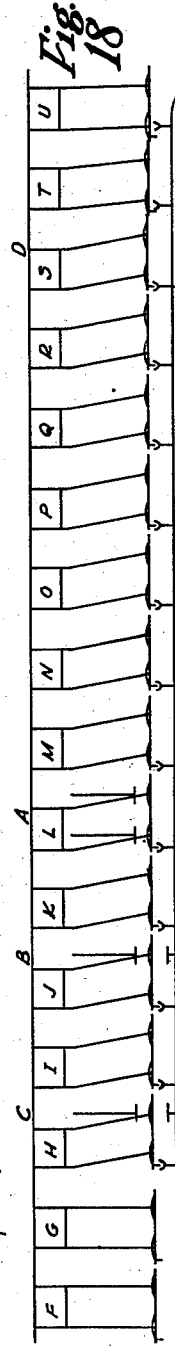
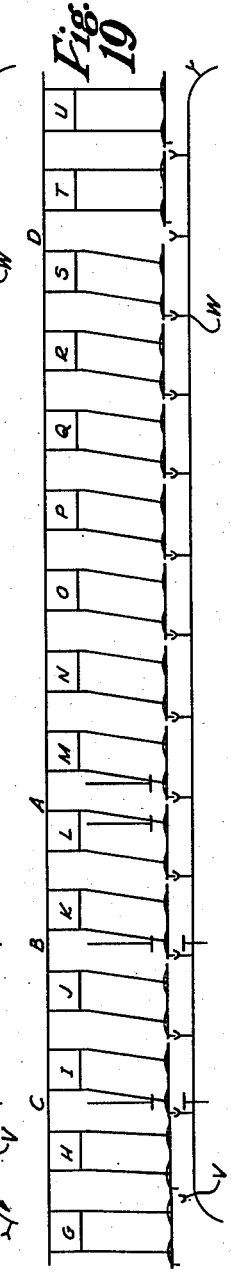
*INVENTOR.*
WALTER H. EMERSON, DECEASED
BY ELIZABETH KING EMERSON, EXECUTRIX
BY
Brown, Critchlow, Flick & Peckham
Attorneys Patented May 29, 1951

2,555,227

UNITED STATES PATENT OFFICE 2,555,227

ARTICLE HANDLING APPARATUS

Walter H. Emerson, deceased, late of Liverpool Township, Columbiana County, Ohio, by Elizabeth King Emerson, executrix, Liverpool Township, Columbiana County, Ohio, assignor to The Homer Laughlin China Company, Newell, W. Va., a corporation of Delaware Application May 21, 1948, Serial No. 28,467

27 Claims. (Cl. 198—19)

This invention relates to article handling apparatus that includes a continuously traveling conveyor, and more particularly to conveying apparatus especially suitable for use in manufacturing dinnerware.

In many industries it is desirable to perform operations or work on articles while they are supported by the conveyor by which they are transferred from one location to another. It is obvious that if the articles must stop at a work station while they are being worked upon, at least a portion of the conveyor must alternately stop and start. In some cases this is no problem, but where it is desirable to use a very long conveyor it is not feasible to continually stop and start the whole thing because it requires alternately decelerating and accelerating of too large a mass. It therefore has been suggested that most of the conveyor should travel ahead continuously, but that the articles to be worked upon should be stopped for short intervals of time by using an endless conveyor chain in which there is slack that allows each successive article to be moved ahead quickly and then held stationary until the slack is taken up. Difficulties with such a system are that the conveyor is subjected to periodic jerking every time the slack is taken up, and that the system is a clumsy one at best. These same problems arise where no work is to be done on the articles on the conveyor, but where it is necessary that the articles be loaded onto or removed from temporarily stationary parts of the conveying apparatus.

It is among the objects of this invention to provide an endless conveyor which has no slack in it, which travels continuously at a uniform speed throughout its length, which can travel in paths curved both vertically and horizontally, which carries article supports that can be stopped for predetermined intervals to allow articles thereon to be worked upon or to be loaded and unloaded without interrupting the movement of the conveyor, which can be made any length desired, and which can be used with any desired number of work stations located along its length in any desired locations.

In accordance with this invention, a plurality of pendant carriers are suspended from a continuously traveling overhead conveyor in such a manner as to move lengthwise of it. The conveyor most suitably includes an endless overhead track along which trolleys are pulled by a continuously traveling endless chain connected to them. The pendant carriers preferably are in the form of swings having normally upright suspension units, such as parallel arms pivotally suspended from the trolleys. The lower ends of the arms carry horizontal article supports that, for example, may be rings in which dinnerware molds are seated. Mechanism is provided for positioning each successive article support at a work station a predetermined length of time while the upper end of the swing travels forward with the conveyor, thereby allowing an operation to be performed on articles carried by the support while it is at that station, or permitting articles to be loaded on or removed from the stationary support. Preferably, as each successive swing approaches a work station the swing is swung forward to position its article support at that station until the upper end of the swing has traveled forward at least to a point where its suspension unit is upright again. Most suitably, the article support is held at the station until the upper end of the swing has traveled a predetermined distance past its upright position.

The mechanism that periodically swings article supports ahead is an indexing mechanism which may take the form of an endless belt or chain that moves forward a predetermined distance intermittently. It may be provided with latches for latching onto an article support while the indexing chain is stationary, after which the chain moves the latches forward rapidly to swing the article support ahead. The indexing mechanism then stops and holds the article support stationary while the overhead conveyor chain continues to travel forward a predetermined distance. In a dinnerware making machine, clay may be deposited on the molds at a first station, at the next station the molds may be lifted from their supporting rings and the clay be spread or pressed over the molds by suitable apparatus above them, and at a third station the molds again may be lifted from the rings and the clay jiggered. After the molds have been returned to the rings for the last time, the indexing mechanism is disconnected from the article support and the conveyor can carry the molds through a drier and a ware stripping station before returning the molds to the clay feeding station to repeat the cycle.

Figure 2:
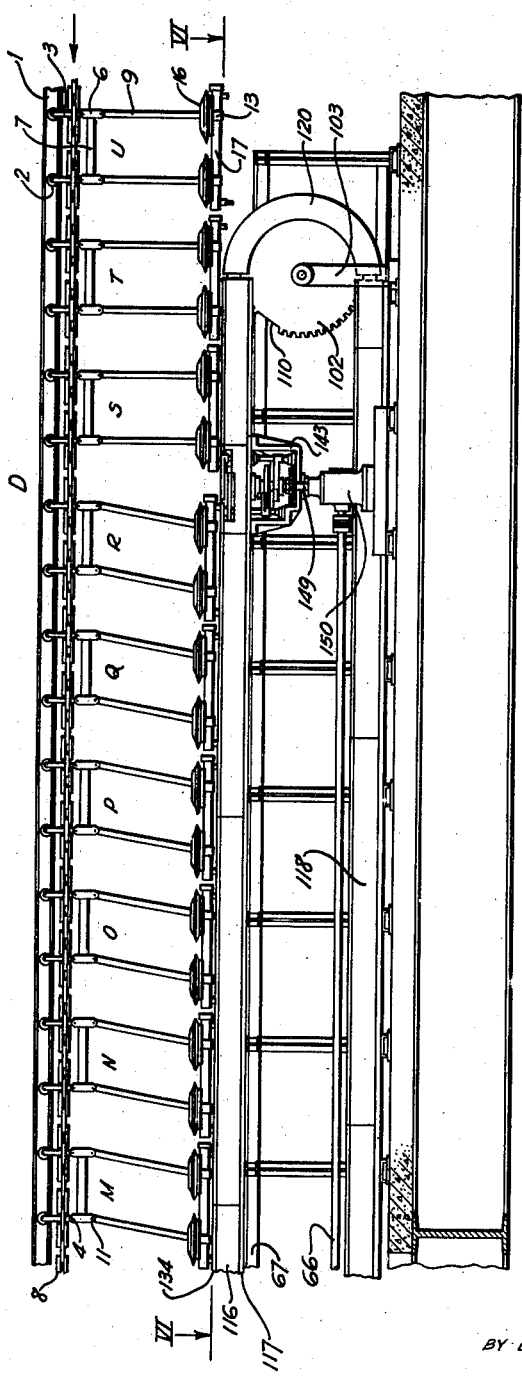
Figure 9:
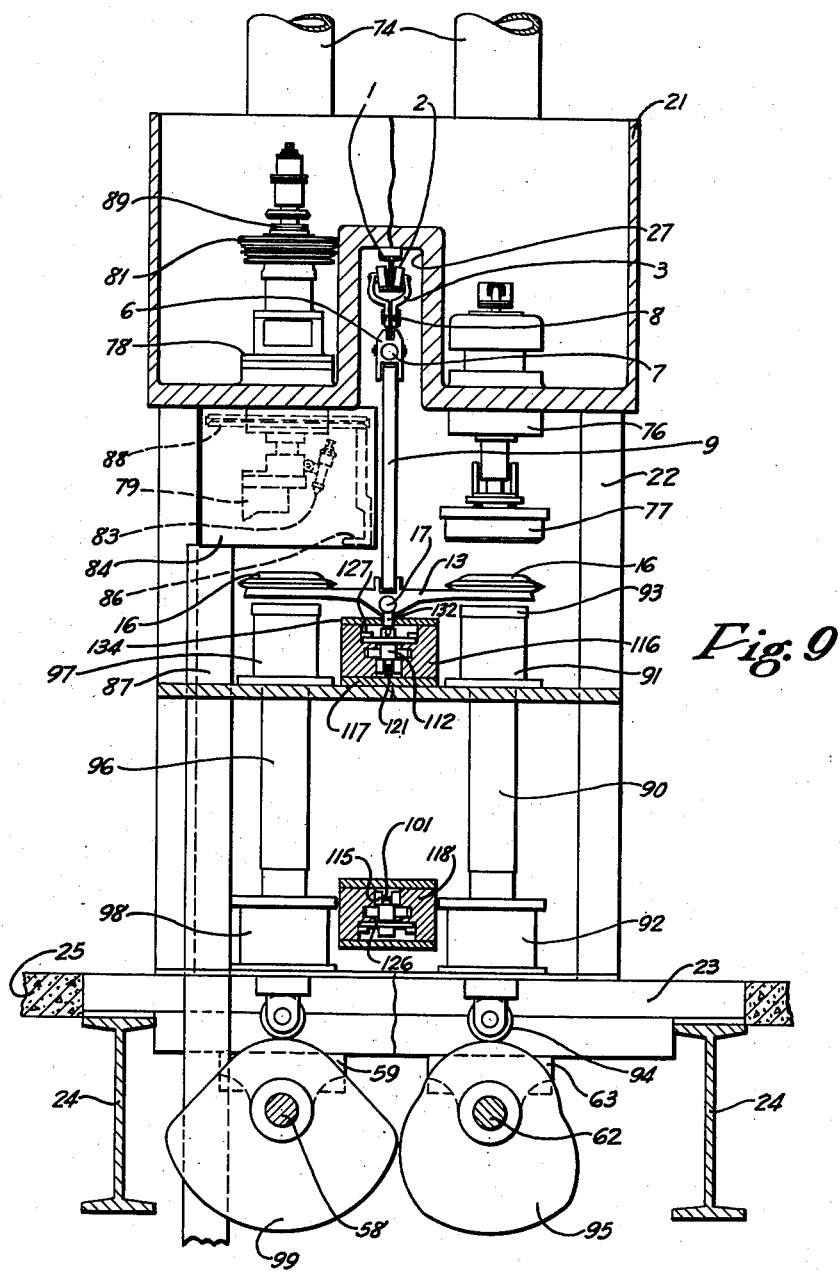
Figure 15:
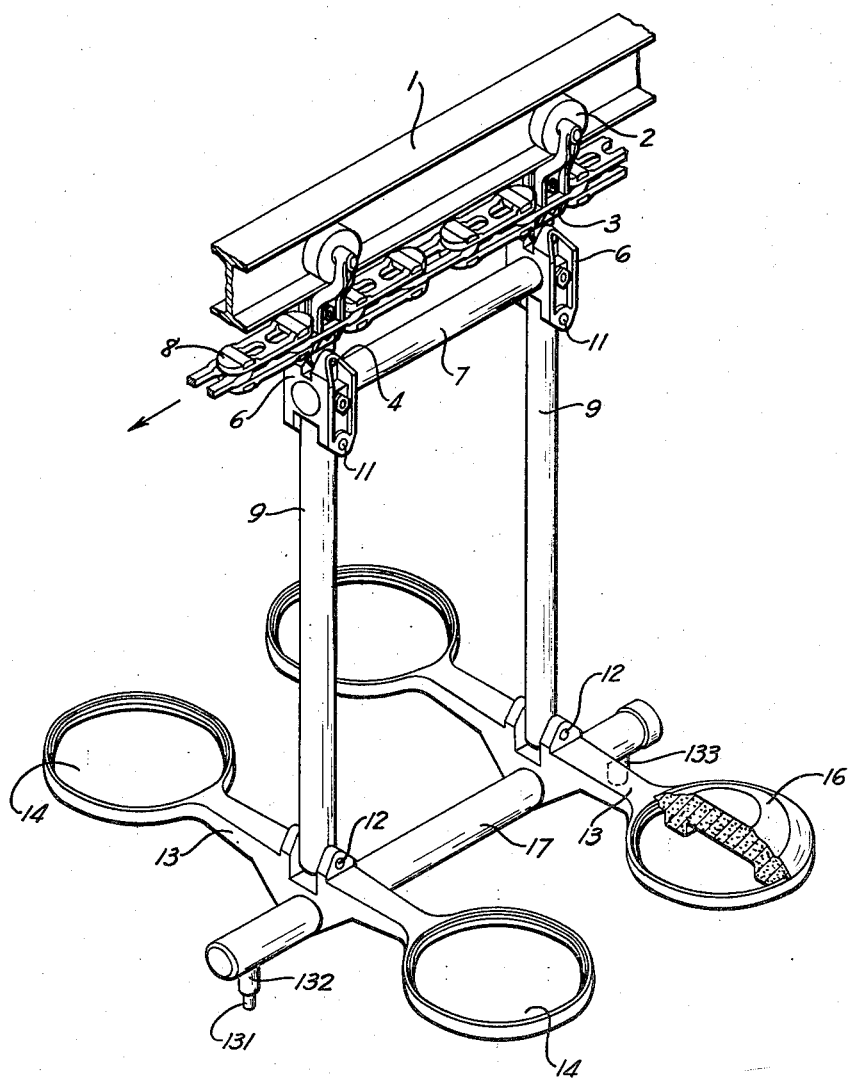

For convenience and as one application of the invention it will be described herein in connection with a dinnerware forming machine. Nevertheless, the invention is not limited to the dinnerware art as it is obvious that it can be used in many different industries. In the accompanying drawings Fig. 1 is a fragmentary side view of my article handling apparatus used in combination with a dinnerware forming machine and showing the front half of the indexing mechanism; Fig. 2 is a side view of the apparatus showing the rear half of the indexing mechanism; Figs. 3 and 4 are plan views of the portions of the apparatus shown in Figs. 1 and 2, respectively; Fig. 5 is a horizontal section taken on the line V—V of Fig. 1; Fig. 6 is a plan view taken on the line VI—VI of Fig. 2; Fig. 7 is a vertical section taken on the line VII—VII of Fig. 1; Fig. 8 is an enlarged horizontal section on the line VIII—VIII of Fig. 7; Fig. 9 is an enlarged vertical section on the line IX—IX of Fig. 3; Fig. 10 is an enlarged side view of the carrier-stopping and latching station shown in Fig. 2; Fig. 11 is a vertical section on the line XI—XI of Fig. 10; Figs. 12 and 13 are horizontal sections taken on the lines XII—XII and XIII—XIII, respectively, of Fig. 10; Fig. 14 is an enlarged side view of a latch car; Fig. 15 is an enlarged isometric view of one of the pendant carriers suspended from a trolley; and Figs. 16 to 19 are diagrammatic side views of the apparatus as it appears at different periods in the cycle.

Referring to Fig. 15 of the drawings, the overhead conveyor consists of three main parts; an endless track, trolleys running on the track, and an endless chain connected to the trolleys for moving them. An I-beam 1 makes a good track, and due to the construction of this conveyor the track can be curved both horizontally and vertically to suit local conditions and also be of any length desired. It is supported from above in any suitable manner, not shown. Each trolley has two pairs of wheels 2 supported by the lower flanges of the track. The wheels are rotatably mounted in forked members 3 which hang down below the center of the track. The lower ends of the two forks are provided with enlarged holes through which loosely extend pins 4 that support brackets 6. These brackets are spaced apart by a rod 7 rigidly connected thereto. Alternate links of the conveyor chain 8 are provided with vertical longitudinal slots through some of which the trolley forks extend. The side faces of the forks are slotted to receive the links to support the chain. When the chain travels forward it pulls all of the trolleys along the track with it.

Each trolley supports a pendant carrier or swing. Thus, brackets 6 pivotally support parallel vertical arms 9 by means of pivot pins 11. The lower ends of these arms are pivotally connected by pivot pins 12 to the central portions of a pair of article supports which, in the case of dinnerware making apparatus, are cross members 13 provided with ring shape ends that form recesses 14 for receiving dinnerware molds 16. The lower ends of the vertical arms are spaced apart the same distance as their upper ends by means of a horizontal bar 17 that extends through the central portions of cross members 13 in which the bar is rigidly mounted. This arrangement provides a parallel linkage system in which bar 17 is permitted to swing lengthwise relative to rod 7, but always is maintained parallel to that rod. The loose connection between brackets 6 and forks 3 allows the trolley wheels to follow the track 1 around curves without binding on the track. The carriers support parallel lines of molds extending along opposite sides of the conveyor below the track, with the molds in each line preferably spaced apart uniformly.

One or more work stations are located along the conveying apparatus to permit work to be performed upon the articles carried thereby. Each station has two work units so that work can be done simultaneously on articles carried by both ends of a cross member 13. When dinnerware is being made, these stations generally consist of a clay feeding station A, a pressing or spreading station B and a jiggering station C, as shown in Figs. 1 and 3. In such a case the conveyor preferably extends through the upper part of a ware-fabricating machine having a long rectangular frame 21 mounted on top of posts 22. The posts are supported by cross beams 23 resting at their ends on a pair of parallel floor beams 24, between which the floor 25 is omitted for a certain distance.

As shown in Figs. 7 and 9, the central portion of the frame is offset upwardly throughout its length to form a passage 27 for the track and trolleys. The track is secured to the upper wall of this passage which, in front of jiggering station C, is widened out in one direction and has the central portion of its top open, as shown in Figs. 3 and 7. Attached to the central portion of the widened passage's side wall nearest the conveyor is a long horizontal bracket 28 in which a series of vertical rollers 29 are mounted. These rollers engage one side of the conveyor chain 8 traveling through the passage. As shown in Fig. 8, on the other side of the chain there is an endless drive chain 32 that extends around front and rear sprockets 33 and 34 mounted on vertical shafts 36 and 37, respectively, rotatably mounted in vertically spaced walls of the frame. The portion of the drive chain opposite the rollers is backed up by a horizontal rail 38 supported by threaded studs 39 adjustably mounted in vertical angle bars 41 attached to the top of a rectangular framework 42. This framework is slotted and adjustably connected by screws 43 to the tops of parallel transverse ribs 44 on the bottom wall of frame 21. The drive chain carries lugs 45 that project laterally into the links of conveyor chain 8 for moving the latter ahead at a constant speed.

For driving the drive chain 32, on the upper end of front sprocket shaft 36 there is a large sprocket 47 connected by a chain 48 to a smaller sprocket 49 mounted on the upper end of a vertical shaft 51 that extends down through frame 21 to a speed reducing unit 52 located between floor beams 24. This unit, and the electric motor 53 that drives it through a wide chain belt 54, are supported by a framework 56 suspended from the floor beams. Chain 54 simultaneously drives another speed reducing unit 57 connected to the front end of a long cam shaft 58 journaled in bearings 59, some of which are secured to the bottoms of cross beams 23. As shown in Fig. 5, this shaft is connected by a chain and sprocket drive 61 to a parallel shorter cam shaft 62 journaled in bearings 63, and the latter shaft is connected by a chain and sprocket drive 64 to a third shaft 66 above the floor level.

Shaft 66 extends rearward away from the machine frame and is rotatably supported by one side of a long, low framework 67 mounted on the floor below the conveyor. The front end of this shaft is connected through a gear box 68 and a chain and sprocket drive 69 to a pair of vertical shafts 71 journaled at opposite sides of the framework 67 and extending above it to drive two clay cut-off mechanisms 72, each of which may be constructed in accordance with my Patent No. 2,278,513. Plastic clay is fed to the cut-off mechanisms from nozzles 73 connected to the lower ends of clay-conducting tubes 74 extending down from the floor above. There are two tubes on each side of the overhead conveyor; one pair for each cut-off mechanism. One tube of each pair remains idle as long as clay is being extruded from the other one. The two tubes are spaced apart the same distance as the dinnerware molds directly below them.

Slices of clay deposited on the molds at the clay feeding station A are carried forward to a station B beneath the rear end of frame 21 where each slice is spread out over the mold supporting it. For this purpose the frame is provided with a pair of laterally spaced vertical openings, in each of which the housing 76 of clay pressing apparatus is mounted. Projecting from the lower end of the housing is a heated die 77, the lower surface of which is shaped to press clay on a dinnerware mold into the approximate shape of an article of ware. This pressing apparatus may be similar to that disclosed in my Patent No. 2,310,068.

The central portion of the frame, at station C, is provided with laterally spaced vertical openings, through each of which extends dinnerware jiggering apparatus 78, such as is shown in my Patent No. 2,362,058, for profiling and polishing the ware. This apparatus includes a continuously rotating profile tool 79 driven by a belt 81 from an electric motor 82 on the frame, one or more intermittently operating water sprayers 83 for moistening the clay as it is being jiggered, a surrounding housing 84 for catching the clay scrap thrown off from the mold by the revolving tool, and a scrapper 86 revolving in the housing for pushing the clay scrap into a chute 87 by which it is carried away from the machine. The scrapper is rotated from above by a pulley 88 driven in conventional manner from a belt drive 89 in the top of frame 21.

At the pressing and jiggering stations the clay-covered molds are lifted from their supporting rings and pushed up against the pressing and jiggering tools in the manner disclosed in my above-mentioned Patent No. 2,362,058, and then set back in the same rings. This is done at the pressing station B by posts 90 reciprocable vertically in upper and lower bearings 91 and 92. The upper ends of the posts carry chucks 93 that are projected up through the carrier rings to lift the molds, while their lower ends are provided with rollers 94 that rest on cams 95 mounted on cam shafts 58 and 62. The molds at the jiggering station are elevated by posts 96 reciprocable in upper and lower bearings 97 and 98 by cams 99 mounted on the two cam shafts. After the ware has been jiggered and returned to the pendant carriers, it is carried by the conveying apparatus through a drier (not shown), and then through a station where the dried ware is removed from the molds. The empty molds then return to the clay feeding station A again to begin the cycle anew.

It is a feature of this invention that the forward travel of the mold carriers can be interrupted at each work station for a predetermined interval without interfering with the continuous movement of the overhead conveyor at a uniform speed. Preferably, the mold supports 13 are swung forward quickly as they approach each work station, and then are held at that station while the upper ends of their inclined suspension units (arms 9) are traveling forward with the conveyor chain and trolleys to a point where the suspension units again are vertical. By continuing to hold the mold supports at the work stations until the upper ends of the suspension units have traveled forward beyond their vertical position for a predetermined distance, a longer work period is provided.

For accomplishing this periodic swinging of the mold supports, an indexing mechanism is provided, preferably consisting principally of an intermittently traveling endless chain below the bars 17 of the pendant carriers. This chain is primarily a roller chain consisting of short links 100 connected to long bar links 101 (Fig. 14) that are spaced apart the same distance as the centers of the trolleys. The indexing chain travels around a rear sprocket 102 supported by bearings 103 mounted in the rear end of the framework, and a front sprocket 104 keyed on an overhanging shaft 106 projecting from the upper part of a housing 107 that is supported by cross beams 23 near the front end frame 21. Inside this housing there is a conventional Geneva mechanism (not shown) in which shaft 106 supports the usual spider that is rotated intermittently by a rotor driven indirectly through a miter gear by a short drive shaft 108 that extends rearward out of the housing. This shaft is driven from cam shaft 58 by a chain and sprocket drive 109. Consequently, the spider and the front sprocket 104 driven by it are turned a certain number of degrees, preferably 60°, every time the cam shaft makes a complete revolution, thereby moving the upper length of the indexing chain ahead periodically. The periphery of each sprocket is provided with three flats 110 (Figs. 1 and 2) 120° apart to receive bar links 101 as they go around the sprocket.

Rigidly mounted on each bar link 101 is a latch car 112, as shown in Figs. 9, 11, 12 and 14. Each car is provided at each end with a pair of horizontal rollers 113 that travel in slots 114 in the sides of spaced parallel rails, and with vertical rollers 115 that engage the inner surfaces of the rails, whereby vertical and lateral movements of the cars are prevented. The upper rails 116 are mounted on plates 117 supported on top of framework 67, while the lower rails 118 are supported in the lower part of the framework. At the ends of the rails the cars travel in front and rear curved rails 119 and 120 that connect the upper and lower rails and extend about halfway around the front and rear sprockets. Extending along the center of plates 117, midway between the upper rails, is a narrow third rail 121 along which the bar links slide. Each of those links has a longitudinal recess in its bottom for receiving the top of the third rail. The short links 100 of the index chain also slide or roll along the third rail which thereby prevents the chain from sagging.

The center of each car 112 is provided with a bearing from which a short shaft 125 projects. Mounted on the outer end of this shaft is a rearwardly extending triangular plate 126 on the rear corners of which there are small rollers 127 that engage the parallel rails. Between these rollers a latch block 128 is rigidly mounted on the plate, and is provided in one side with a semicircular recess 129. When a latch block is swung into line with the indexing chain, its recess 129 will partly encircle the lower end of a pin 131 projecting down from a roller 132 depending from the front end of the bar 17 of the particular pendant carrier which happens to be in position above it at the time. Another roller 133 extends down from the rear end of each bar 17. Extending along the top of upper rails 116 are guide plates 134 that are spaced apart just far enough to permit rollers 132 and 133 to move along between them.

To swing the latch plates 126 into latching position, a latching station D is provided just in front of the rear sprocket. This station is shown in detail in Figs. 10 to 13. Before a carrier is latched to a car on the indexing chain, the carrier is stopped by a stop pin 136 (Fig. 12) slidably mounted in a pair of lugs 137 on the side of an arm 138. This pin normally is held in its rear position by a coil spring 139 encircling it. The arm extends into a recess in one of the upper rails and has its rear end rigidly mounted on the upper end of vertical shaft 141 journaled in bearings 142 carried by a housing 143 suspended from the upper rails. The lower end of this shaft carries a forwardly extending arm 144 that is oscillated by a cam 146 mounted on a center shaft 147. The center shaft is rotated by a chain and sprocket drive 148 from a shaft 149 projecting from the top of a gear box 150 into which the rear end of shaft 66 extends. The cam is shaped to swing stop pin 136 away from in front of a front carrier roller 132 after the roller has been engaged by a latch block 128.

Every other time the indexing chain stops, it stops a latch car 112 below stop pin 136, and a front carrier roller 132 comes into engagement with the stop. The adjoining latch plate 126, however, has been swung to one side by the rails behind it, because behind the latching station the upper portion of one rail is wider than the other, as shown in Figs. 6 and 12. After coming to rest at the latching station, the latch plate is swung back to centered position by a lever 152 mounted on the upper end of a shaft 153 journaled in housing 143. The lower end of this shaft carries a rearwardly extending arm 154 that is oscillated by a cam 155 mounted on center shaft 147. Arm 154 is pulled toward the cam by a spring 156, and is connected by a link 157 to another arm 158 mounted on a shaft 159 also journaled in the housing. The upper end of this shaft carries a lever 160 that engages one of the latch plate rollers 127 and moves in unison with lever 152 which engages the other roller. As cam 155 rotates, it permits spring 156 to cause lever 152 to swing the latch block 128 into operative position where it will straddle carrier pin 131. When the indexing chain carries the latch car forward away from the latching station, the latch plate will be held in latching position by the sides of the upper rails. The indexing chain moves ahead much faster than the conveyor chain 8 so that the latch swings the lower end of the mold carrier forward ahead of its upper end. The indexing chain then stops and latch block 128 holds carrier bar 17 stationary until the chain is indexed ahead again.

While the latch block is stationary the carrier pin 131 will move down in latch block 128 and then up again as the suspension unit of the carrier passes through vertical position. However, this does not affect the operations being performed on the molds 16 because the vertical movement of the molds is not great enough to make any difference at the clay feeding station A, while at the pressing and jiggering stations B and C the molds are lifted from their supporting rings and are supported by the chucks on posts 90 and 96 during the working periods.

After a carrier leaves the jiggering station, the upper portion of one of the upper rails again becomes wider while the other one becomes narrower, so as to serve as a cam which swings the latch plate 126 to one side to disengage latch block 128 from the carrier pin 131, whereby the pendant carrier is released from the indexing mechanism.

Operation

The operation of this apparatus now will be reviewed. The different elements of the apparatus are shown in Figs. 1 and 2 in the positions they occupy at the start of a work cycle, during which clay deposited on the molds will be pressed and jiggered on the front pair of molds on each carrier. It will be seen in Fig. 1 that carrier E, which has left the fabricating zone, is hanging freely from the overhead conveyor, while carriers F and G also have been released from the indexing chain but at the moment are swung forward varying amounts by carrier H which is held at jiggering station C by indexing chain latch V. Carrier J is held at pressing station B in a like manner, and carriers K and L are held at clay feeding station A where clay is fed from the front or rear pair of tubes 74 to the molds 16 that happen to be under that pair. Carriers M through R also have been swung ahead by the indexing chain, but carrier S and those behind it have not yet reached the latching station D. The indexing chain having come to rest, clay can be fed from one set of nozzles 73 to the underlying molds, and posts 90 and 96 are ready to be moved by cams 95 and 99, respectively, upward through carrier recesses 14 to lift molds from the carriers in order to present the clay blanks thereon to presses 77 and jigger tools 79.

While these operations are being performed, overhead conveyor chain 8 continues to move the trolleys forward at a uniform speed while the latched carrier bars 17 remain stationary except for slight vertical movement as the trolleys move through center above them. Of course, chain 8 carries the unlatched carrier bars ahead, so that by the time the clay feeding, pressing and jiggering operations are finished and the molds have been set back on the carriers at stations A, B, and C, carrier S has moved forward far enough to be stopped by the stop pin 136 and to be connected to the indexing chain by latch block 128 of latch W (Fig. 16). The stop pin then is swung to one side in the manner described previously, and the upper strand of the indexing chain is ready to be moved forward by the Geneva mechanism. At this moment the carriers are in the positions shown in Fig. 16 where it will be seen that carriers F and G now hang free, and that carrier T has bumped into latched carrier S.

Assuming that the centers of the molds are 16 inches apart, the indexing chain then moves ahead 16 inches and stops, to locate the rear sets of molds on carriers H and J at stations C and B, as shown in Fig. 17 which represents the end of the index cycle and the start of the next or second work cycle. It will be seen that carriers F and G have been pushed ahead slightly by latched carrier H, but that latched carrier S, in moving ahead, has allowed unlatched carriers T and U to hang free. As the overhead chains 8 and the trolleys continue to move forward, the pressing and jiggering operations performed at stations B and C, as described in connection with Fig. 1, now are repeated on the rear sets of molds on the carriers H and J. When these operations have been completed and the molds have been returned to their carriers, the second index cycle takes place. The start of this cycle is shown in Fig. 18 where it will be seen that carrier H is still connected by latch V to the indexing chain and that carrier T has not yet become connected to it.

At the end of the second index cycle, which is shown in Fig. 19, the carriers again are in the same positions they occupied in Figs. 1 and 2, except all carriers have been moved ahead a full step, or 32 inches. That is, the position of carrier H in Fig. 1 has been taken by carrier I in Fig. 19, and the position of carrier R in Fig. 2 has been taken by carrier S in Fig. 19. Carrier H has been released automatically from latch V, but at the moment it has been swung forward slightly by latched carrier I behind it. Fig. 19 also represents the apparatus at the start of the next work cycle, during which carrier T will be moved ahead far enough to become connected to the latch behind latch W. The work and index cycles are repeated alternately, in the manner just described, for as long as the apparatus is operating.

Although this invention has been described in connection with the manufacture of dinnerware, it will be obvious that it can be used in many other fields. The overhead chain conveyor, which is the simplest and cheapest kind of conveyor to install and maintain, travels continuously at a uniform speed. There is no slack in it, and it can travel laterally in any direction and up and down inclines. Yet, the article supports carried by the conveyor chain can be stopped long enough at each of any desired number of stations to load or unload the supports or to perform operations on the articles supported thereby.

According to the provisions of the patent statutes, the principle of the invention has been explained and what is considered to represent its best embodiment has been illustrated and described. However, it should be understood that, within the scope of the appended claims, the invention may be practiced otherwise than as specifically illustrated and described.

What is claimed is:

1. Article handling apparatus comprising a continuously traveling overhead conveyor, pendant carriers suspended from the conveyor at intervals, each carrier being provided with an article support adapted to move back and forth lengthwise of the conveyor within predetermined limits, and mechanism for directly engaging and holding each successive article support at a work station against movement lengthwise of the conveyor for a predetermined length of time while the overhead conveyor continues to travel forward.

2. Article handling apparatus comprising a continuously traveling overhead conveyor, pendant carriers suspended from the conveyor at intervals, each carrier being provided with an article support adapted to move back and forth lengthwise of the conveyor within predetermined limits, and indexing mechanism for moving each successive article support forward as it approaches a work station to position the article support at that station until after the overhead conveyor has traveled forward a predetermined distance.

3. Article handling apparatus comprising a continuously traveling overhead conveyor, pendant carriers suspended from the conveyor at intervals, each carrier being provided with an article support adapted to move back and forth lengthwise of the conveyor within predetermined limits, an intermittently operating arresting member adapted to stop forward movement of each successive support as it approaches a work station, and indexing means for engaging each successive stopped article support and then moving it forward to position it at the work station until the overhead conveyor has traveled forward a predetermined distance.

4. Article handling apparatus comprising a continuously traveling overhead conveyor, pendant carriers suspended from the conveyor at intervals, each carrier being provided with an article support adapted to move back and forth lengthwise of the conveyor within predetermined limits, latches for gripping successive supports as they approach a work station, and intermittently moving indexing mechanism for periodically moving the latches ahead faster than said conveyor to move each successive article support forward to the work station and hold it there for a predetermined length of time while the conveyor travels forward.

5. Article handling apparatus comprising a continuously traveling overhead conveyor, pendant carriers suspended from the conveyor at intervals and adapted to swing lengthwise of it, each carrier having a normally upright suspension unit provided at its lower end with an article support, and intermittently moving mechanism for swinging each successive carrier forward as it approaches a work station to position its article support at that station until the upper end of the carrier has traveled forward at least to a point where its suspension unit is upright again, whereby an operation can be performed on an article carried by said support while it is at said station.

6. Article handling apparatus comprising a continuously traveling overhead conveyor, pendant carriers suspended from the conveyor at intervals and adapted to swing lengthwise of it, each carrier having a normally upright suspension unit provided at its lower end with an article support, and traveling indexing mechanism for swinging each successive carrier forward as it approaches a work station to position its article support at that station until after the upper end of the carrier has traveled a predetermined distance past the upright position of its suspension unit.

7. Article handling apparatus comprising a continuously traveling overhead conveyor, pendant carriers suspended from the conveyor at intervals and adapted to swing lengthwise of it, each carrier having a normally upright suspension unit provided at its lower end with an article support, and indexing means for swinging each successive carrier forward as it approaches a work station to position its article support at that station and hold it there until the upper end of the carrier has traveled forward a predetermined distance past a point where its suspension unit is upright again.

8. Article handling apparatus comprising a continuously traveling overhead conveyor, groups of normally vertical arms pivotally suspended by their upper ends from the conveyor on transverse axes, an article support carried by the lower end of each group of arms, and indexing mechanism for swinging each successive article support forward to a work station and for holding it there until after the upper ends of its carrying arms have traveled a predetermined distance past vertical position.

9. Article handling apparatus comprising a continuously traveling overhead conveyor, normally vertical parallel arms pivotally suspended by their upper ends from the conveyor on transverse axes spaced lengthwise of the conveyor, a plurality of horizontal article supports carried by the lower ends of the arms, each support being pivotally connected to a pair of the arms so as to remain horizontal when swung lengthwise of the conveyor, means maintaining the upper ends of said pair of arms the same distance apart as their lower ends, and indexing mechanism for directly engaging and holding each successive article support at a work station against swinging lengthwise of the conveyor while the upper ends of its carrying arms travel forward a predetermined distance, whereby forward movement of an article carried by said support will be arrested while the support is at said station.

10. Article handling apparatus comprising a continuously traveling overhead conveyor, normally vertical parallel arms pivotally suspended by their upper ends from the conveyor on transverse axes spaced lengthwise of the conveyor, a plurality of horizontal bars each pivotally connected on transverse axes to the lower ends of a different pair of the arms, a horizontal bar maintaining the upper ends of each pair of arms the same distance apart as their lower ends, horizontal cross members carried by said bars and adapted to support articles on their opposite ends, and indexing mechanism for holding each successive cross member at a work station against forward travel for a predetermined length of time while the upper ends of its supporting arms travel forward.

11. Article handling apparatus comprising an endless overhead track, trolleys mounted on the track, a continuously traveling endless conveyor connected to the trolleys, pendant carriers suspended from the trolleys and adapted to swing lengthwise of the track, each carrier being provided with an article support at its lower end, and mechanism below the article supports for directly engaging and holding each successive support at a work station against swinging lengthwise of the conveyor for a predetermined period while the conveyor is traveling forward.

12. Article handling apparatus comprising an endless overhead track, trolleys mounted on the track, an endless chain connected to the trolleys, means for driving the chain at constant speed, a pair of parallel arms pivotally suspended by their upper ends on transverse axes from each trolley, a horizontal article support pivotally connected on transverse axes to the lower ends of each pair of arms, means maintaining the upper ends of each pair of arms the same distance apart as their lower ends, and indexing mechanism for directly engaging and holding each successive article support at a work station against forward travel for a predetermined time while all trolleys continue to travel forward.

13. Dinnerware making apparatus comprising an endless overhead track, trolleys mounted thereon, an endless chain connected to the trolleys, means for driving the chain continuously, a pair of parallel arms pivotally suspended by their upper ends on transverse axes from each trolley, a horizontal bar pivotally connected on transverse axes to the lower ends of each pair of arms, horizontal cross members carried by said bars and provided in their opposite ends with mold-receiving recesses, and indexing means for swinging a successive cross member forward as it approaches each fabricating station to position molds carried by said cross member at said station for a predetermined period of time while the supporting trolley carries the upper end of the adjoining arms a predetermined distance past the vertical position of the arms.

14. Article handling apparatus comprising a continuously traveling overhead conveyor, pendant carriers suspended from the conveyor at intervals and adapted to swing lengthwise of it, each carrier being provided at its lower end with an article support, an intermittently operating arresting member adapted to stop forward movement of each successive article support as it approaches a work station, and indexing means for engaging each successive stopped article support and subsequently swinging it forward to position it at the work station until the upper end of the carrier has traveled forward a predetermined distance.

15. Article handling apparatus comprising a continuously traveling overhead conveyor, pendant carriers suspended from the conveyor at intervals and adapted to swing lengthwise of it, each carrier being provided at its lower end with an article support, latches for gripping successive supports as they approach a work station, and indexing mechanism for periodically moving the latches ahead faster than said conveyor to swing each successive article support forward to the work station and hold it there for a predetermined length of time while the upper end of the carrier travels forward with the conveyor.

16. Article handling apparatus comprising a continuously traveling overhead conveyor, pendant carriers suspended from the conveyor at intervals and adapted to swing lengthwise of it, each carrier being provided at its lower end with an article support, a normally stationary endless chain adjacent said supports, a plurality of longitudinally spaced latches mounted on the chain, means for moving the latches into engagement with successive article supports as the latter approach a work station, and indexing means for periodically moving said chain ahead faster than said conveyor to cause the latches to swing each successive engaged article support forward to the work station and hold it there for a predetermined length of time while the upper end of the carrier continues to travel forward.

17. Article handling apparatus comprising a continuously traveling overhead conveyor, pendant carriers suspended from the conveyor at intervals and adapted to swing lengthwise of it, each carrier being provided at its lower end with an article support, a normally stationary endless chain adjacent said supports, a plurality of longitudinally spaced latches mounted on the chain, means for moving the latches into engagement with successive article supports as the latter approach a work station, indexing means for periodically moving said chain ahead faster than said conveyor to cause the latches to swing each successive engaged article support forward to the work station and hold it there for a predetermined length of time while the upper end of the carrier continues to travel forward, and means for releasing the latches from the article supports after work has been performed at the work station.

18. Article handling apparatus comprising a continuously traveling overhead conveyor, pendant carriers suspended from the conveyor at intervals and adapted to swing lengthwise of it, each carrier being provided at its lower end with an article support, an intermittently operating arresting member adapted to stop forward movement of each successive article support as it approaches a work station, latches, means for moving the latches into engagement with successive article supports while they are stopped by said arresting member, indexing means for periodically moving the latches ahead faster than said conveyor to swing each successive engaged article support forward to the work station where it is held for a predetermined length of time while the upper end of the carrier travels forward, and means for releasing the latches from the article supports after they leave the work station.

19. Article handling apparatus comprising a continuously traveling overhead conveyor, groups of normally vertical arms pivotally suspended by their upper ends from the conveyor on transverse axes, an article holder carried by the lower end of each group of arms, each holder being provided with a plurality of article-positioning means spaced lengthwise of the conveyor, all of said means along the conveyor being spaced apart uniformly when said arms are vertical, and indexing mechanism for swinging each successive article holder forward to a work station and for retaining it there until after the upper ends of its carrying arms have traveled a predetermined position past vertical position.

20. In a dinnerware making apparatus, a mold-carrying car comprising longitudinally spaced trolley wheels adapted to travel along an overhead track, rigid longitudinal member spacing the wheels apart, parallel vertical arms pivotally suspended from the opposite ends of said member, a horizontal bar pivotally connected to the lower ends of said arms, and a plurality of horizontal cross members having their central portions rigidly connected to said bar, the opposite ends of each cross member being provided with mold-receiving recesses.

21. Article handling apparatus comprising a continuously traveling overhead conveyor, pendant carriers suspended from the conveyor at intervals and adapted to swing lengthwise of it, each carrier being provided at its lower end with an article support, a pin projecting from the bottom of each carrier, latches for receiving and holding successive pins as the carriers approach a work station, and indexing mechanism for periodically moving the latches ahead faster than said conveyor to swing each successive article support forward to the work station and hold it there while the upper end of the carrier travels forward with the conveyor a predetermined distance.

22. Article handling apparatus comprising a continuously traveling overhead conveyor, pendant carriers suspended from the conveyor at intervals and adapted to swing lengthwise of it, each carrier being provided at its lower end with an article support, horizontal rails extending lengthwise of said conveyor below the carriers, a plurality of cars adapted to travel forward along the rails, an intermittently moving chain connecting the cars, a latch member mounted on each car for gripping the lower end of a carrier as it approaches a work station, and means for moving said chain ahead periodically faster than said conveyor to cause a latch member to swing a carrier forward to the work station and hold it there while the upper end of the carrier travels forward with the conveyor a predetermined distance.

23. Article handling apparatus comprising a continuously traveling overhead conveyor, pendant carriers suspended from the conveyor at intervals and adapted to swing lengthwise of it, each carrier being provided at its lower end with an article support, horizontal rails extending lengthwise of said conveyor below the carriers, a plurality of cars adapted to travel forward along the rails, an intermittently moving chain connecting the cars, a latch member mounted on each car, means for moving each successive latch member into engagement with a different carrier, and means for periodically drawing said chain ahead faster than said conveyor to cause each successive engaged latch member to swing a carrier forward to a work station and hold it there while the upper end of the carrier travels forward with the conveyor a predetermined distance.

24. Article handling apparatus comprising a continuously traveling overhead conveyor, pendant carriers suspended from the conveyor at intervals and adapted to swing lengthwise of it, each carrier being provided at its lower end with an article support, a pin projecting from the bottom of each carrier, horizontal rails extending lengthwise of said conveyor below the carriers, a plurality of cars adapted to travel forward along the rails, an intermittently moving chain connecting the cars, a latch plate pivotally mounted on each car, a laterally recessed latch block on each plate, means at a latching station for swinging each successive plate laterally to cause its recessed block to straddle one of said pins, and means for periodically driving said chain ahead faster than said conveyor to cause each successive latch block to swing a carrier forward to a work station and hold it there while the upper end of the carrier travels forward with the conveyor a predetermined distance.

25. Article handling apparatus comprising a continuously traveling overhead conveyor, pendant carriers suspended from the conveyor at intervals and adapted to swing lengthwise of it, each carrier being provided at its lower end with an article support, a pin projecting from the bottom of each carrier, horizontal rails extending lengthwise of said conveyor below the carriers, a plurality of cars adapted to travel forward along the rails, an intermittently moving chain connecting the cars, a latch plate pivotally mounted on each car, a laterally recessed latch block on each plate, means at a latching station for swinging each successive plate laterally to cause its recessed block to straddle one of said pins, and means for periodically driving said chain ahead faster than said conveyor to cause each successive latch block to swing a carrier forward to a work station and hold it there while the upper end of the carrier travels forward with the conveyor a predetermined distance, said rails being shaped to swing the latch plates and blocks away from said pins after the carriers leave the work station.

26. Article handling apparatus comprising a continuously traveling overhead conveyor, pendant carriers suspended from the conveyor at intervals and adapted to swing lengthwise of it, each carrier being provided at its lower end with an article support, a pin projecting from the bottom of each carrier, horizontal rails extending lengthwise of said conveyor below the carriers, a plurality of cars adapted to travel forward along the rails, an intermittently moving chain connecting the cars, a latch plate pivotally mounted on each car, a laterally recessed latch block on each plate, a pivotally mounted horizontal lever associated with one of said rails, means for periodically swinging the lever toward the other rail to cause the lever to swing a latch block into gripping engagement with one of said pins, and means for periodically driving said chain ahead faster than said conveyor to cause each successive latch block to swing a carrier forward to a work station and hold it there while the upper end of the carrier travels forward with the conveyor a predetermined distance.

27. Dinnerware making apparatus comprising an endless overhead track, trolleys mounted thereon, an endless chain connected to the trolleys, means for driving the chain continuously, a pair of parallel arms pivotally suspended by their upper ends on transverse axes from each trolley, a horizontal bar pivotally connected on transverse axes to the lower ends of each pair of arms, horizontal cross members carried by said bars and provided in their opposite ends with mold-receiving recesses adapted to pass over a series of ware fabricating stations, indexing means for swinging each successive bar forward as it approaches each fabricating station to position molds carried by it at said station for a predetermined period of time while the supporting trolley carries the upper end of the adjoining arms a predetermined distance past the vertical position of the arms, and means for releasing each successive bar from said indexing means after the molds carried by that bar leave the last fabricating station.

ELIZABETH KING EMERSON,
*Executrix of Estate of Walter H. Emerson, Deceased.*

REFERENCES CITED

The following references are of record in the file of this patent:

UNITED STATES PATENTS

| Number | Name | Date |
|---|---|---|
| 501,331 | Doolittle | July 11, 1893 |
| 801,523 | Hinchman | Oct. 10, 1905 |
| 1,769,528 | Miller | July 1, 1930 |
| 1,906,036 | Wunderlich | Apr. 25, 1933 |
| 2,371,624 | Hudson | Mar. 20, 1945 |
| 2,376,800 | Miller | May 22, 1945 |
| 2,478,034 | Zademach et al. | Aug. 2, 1949 |

FOREIGN PATENTS

| Number | Country | Date |
|---|---|---|
| 689,952 | France | Sept. 15, 1930 |